(12) United States Patent
Cheng et al.

(10) Patent No.: US 7,671,972 B2
(45) Date of Patent: Mar. 2, 2010

(54) OPTICAL SENSING METHODS AND APPARATUS

(75) Inventors: Kwok Sing Cheng, New Territories (CN); Ho Shan Ng, Kowloon (CN); Lai Man Chau, New Territories (CN); Yeung Ming Chow, New Territories (CN); Tao Tao, New Territories (CN)

(73) Assignee: Hong Kong Applied Science and Technology Research Institute Co., Ltd., Hong Kong SAR (CN)

( * ) Notice: Subject to any disclaimer, the term of this patent is extended or adjusted under 35 U.S.C. 154(b) by 0 days.

(21) Appl. No.: 11/730,055

(22) Filed: Mar. 29, 2007

(65) Prior Publication Data

US 2008/0239325 A1    Oct. 2, 2008

(51) Int. Cl.
*G01P 3/36* (2006.01)
(52) U.S. Cl. ........................ 356/28; 356/28.5
(58) Field of Classification Search .................. 356/28
See application file for complete search history.

(56) References Cited

U.S. PATENT DOCUMENTS

| 4,552,456 | A  | * | 11/1985 | Endo ........................ 356/5.06 |
| 5,336,899 | A  | * | 8/1994  | Nettleton et al. ....... 250/559.29 |
| 5,491,642 | A  | * | 2/1996  | Wormell et al. ............... 702/49 |
| 6,844,537 | B2 | * | 1/2005  | Wilson et al. ............ 250/206.1 |
| 2004/0135992 | A1 | * | 7/2004 | Munro ....................... 356/4.01 |

\* cited by examiner

*Primary Examiner*—Thomas H Tarcza
*Assistant Examiner*—Luke D Ratcliffe
(74) *Attorney, Agent, or Firm*—Buchanan Ingersoll & Rooney PC

(57) ABSTRACT

A method of sensing movement or proximity of objects by optical reflection is provided. The method includes the steps of transmitting a train of optical pulses towards a destination, sensing optical pulses reflected from the destination, and sensing and evaluating movement or proximity characteristics of objects at the destination with reference to variation in pulse width between transmitted and reflected optical pulses.

11 Claims, 11 Drawing Sheets

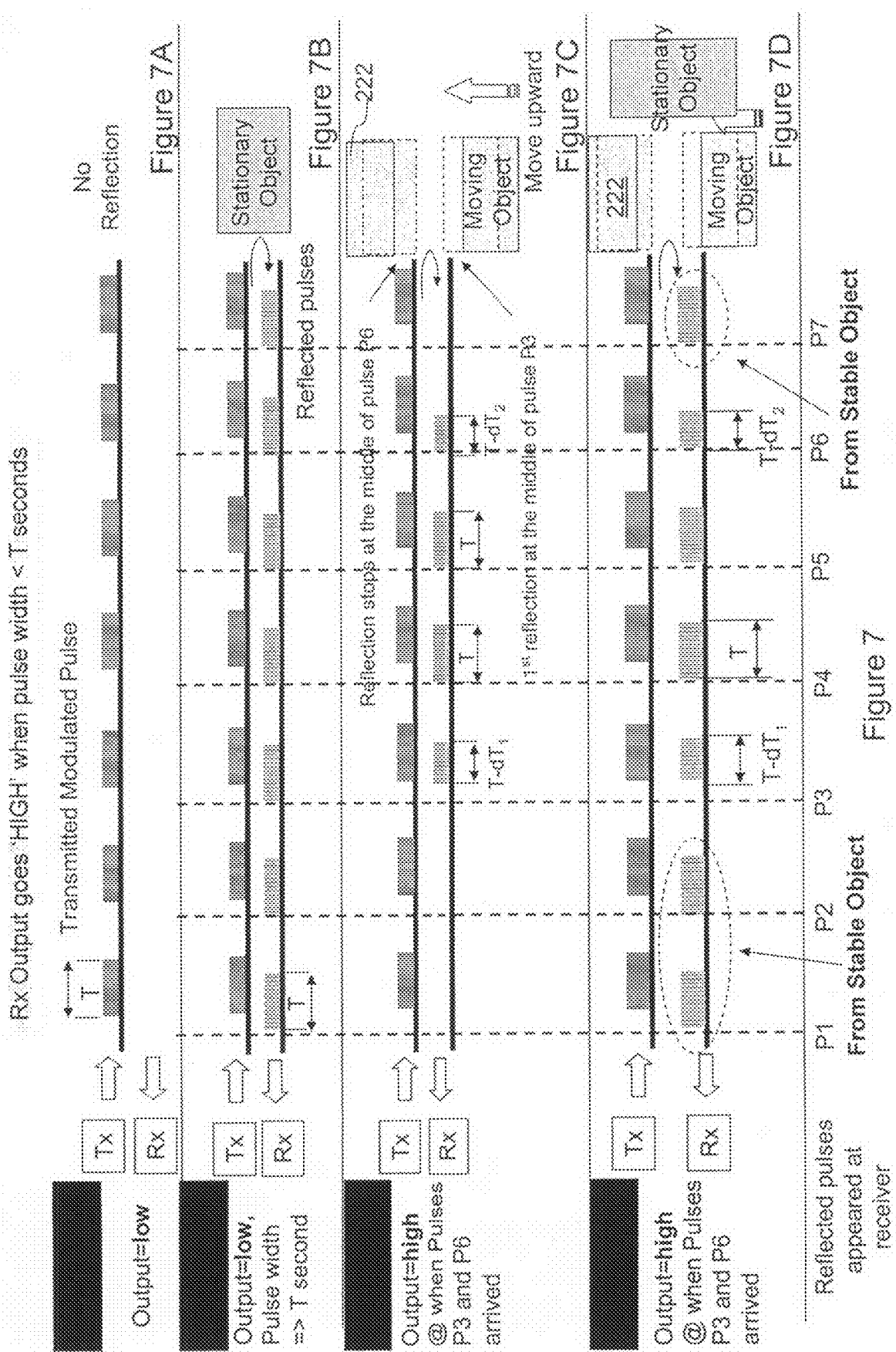

Spectrum of optical signal

Spectrum after mixed with local oscillator and lowpass filtered at receiver

Spectrum at Laser Driver Output

Spectrum at Photodiode +TIA Output

Front View

Profile View

Collimated Vertical Light Beam

Slightly Diverged Horizontal Light Beam

Cross Section View

OPTICAL SENSING METHODS AND APPARATUS

FIELD OF THE INVENTION

The present invention relates to optical sensing apparatus and methods. More particularly, this invention relates to methods and apparatus for sensing movement of objects.

BACKGROUND OF THE INVENTION

Optical sensing techniques are widely used in automation and other applications. For example, optical sensors are used for detection of movement, presence and absence, and position, of objects in industrial automation process. An example of optical sensors known for such applications is the PX series photo-sensors by Keyence Corporation of the USA.

In a typical optical sensing arrangement, an optical source is arranged on one side of an object for projecting an optical beam towards a destination. An optical detector is positioned on the other side of the object to monitor the detection or reception of optical signals originated from the optical source which are not blocked or intercepted by the objects. Spatial information of the objects, e.g., information on movement, presence and absence, and location, can be obtained from the received optical information. However, such an optical arrangement is known to be bulky and requires expensive components. Further, the reliability of conventional optical sensing arrangements is vulnerable to interference by ambient light noise such as interference from fluorescent lamp and background light. Therefore, it will be beneficial if there can be provided methods and apparatus of optical sensing to alleviate shortcomings of conventional optical sensing arrangements.

SUMMARY OF THE INVENTION

According to the present invention, there is provided a method of sensing movement or proximity of objects by optical reflection, the method comprising:
transmitting a train of optical pulses towards a destination,
sensing optical pulses reflected from said destination, and
sensing and evaluating movement or proximity characteristics of objects at said destination with reference to variation in pulse width between transmitted and reflected optical pulses.

By employing an optical reflection arrangement, a sensing arrangement could be more compact. Furthermore, by evaluating the variation in pulse width between a transmitted and a corresponding reflected pulse to give movement information, a simpler and speedier movement detection method is available.

In an exemplary embodiment, the method may further comprise the step of outputting a positive object movement signal when the variation in pulse width between said transmitted and said reflected optical pulses exceeding a pre-determined threshold.

In a convenient example, said train of optical pulses may comprise optical pulses of a pre-determined pulse width transmitted at pre-determined intervals. A pulse train of pre-determined pulse intervals will simplify detection mechanism.

In a convenient example, the pulse width of said train of pulses may be constant. A constant pulse width simplifies pulse tracking requirements.

In an exemplary embodiment, the train of optical pulses may be transmitted at an angle to the movement of objects, the pulse width or pulse duration of said optical pulses may be larger than the transit time of said objects with respect to said optical train.

To simplify monitoring, said optical pulses may be transmitted at regular intervals.

To alleviate adverse interference from background optical pollution, such as interferences from fluorescent lamps, each said optical pulse may be modulated with a carrier frequency.

For example, the optical pulses may be modulated by a carrier frequency with a frequency in the multi-kilohertz region.

As an example, said train of optical pulses may comprise a series of alternate modulated bursts and zeroes. Of course, a continuous optical beam with appropriate modulation could also be used as a detection beam source.

In an example, the direction of transmission of optical pulses may be at an angle or orthogonal to the direction of movement of objects to be detected.

To obtain a pre-determined resolution along a predetermined motion direction, said optical pulses may be transmitted by way of an optical beam of a pre-determined spot size, and the beam spot size may be adjustable.

As a convenient example, said optical pulses may be transmitted from a laser or an LED source.

In the application of this invention for object movement detection, a signal indicating relative movement between an object and an optical source transmitting said train of optical pulses may be produced upon detection of an optical pulse with a pulse width shorter than a corresponding transmitted pulse.

The method of this invention may be implemented by an apparatus comprising an optical source, an optical detector and a signal processor, wherein said optical source may be arranged for emitting a train of optical pulses towards a destination, and said optical detector may be arranged for sensing pulses reflected from said destination; and wherein said signal processor may be arranged for processing pulses detected by said optical detector such that movement or proximity information of an object or objects at said destination may be produced by evaluating variation in optical pulse width between a transmitted pulse and a detected pulse.

The optical source may be arranged so that the direction of transmission of optical pulses is orthogonal to the direction of movement of objects to be detected.

As an example, said optical source may comprise a pulse generator, a carrier generator, a laser driver and a laser or LED source.

For example, said optical detector comprises a photo-diode, a band-pass filter for processing output of said photo-diode and a local oscillator; said local oscillator being configured for demodulating output of said photo-diode.

The optical detector may further comprise an amplifier for enhancing output from said band-pass filter before said output is demodulated.

The optical detector may further comprise a low-pass filter for filtering noise from the demodulated signal.

The apparatus may further comprise means for recording the pulse width of a transmitted pulse, means for recording the pulse width of a received pulse corresponding to said transmitted pulse after reflection from said destination; and wherein said processor may comprise comparison means for comparing width of said transmitted pulse and said received pulse, and decision means for generating a discrete output upon comparison of the pulse width between said transmitted and said received pulse.

The optical source may be arranged so that said train of optical pulses may comprise optical pulses of a pre-determined pulse width transmitted at pre-determined intervals.

The pulse width of said train of pulses may be constant.

The optical pulses may be transmitted at regular intervals.

The optical source may comprise a modulator for modulating said pulses by a carrier frequency.

The optical may comprise a local oscillator for modulating said pulses.

The local oscillator may be configured to operate in the multi-kilohertz range.

The optical source may comprise a collimator which is arranged to transmit an optical beam with an adjustable spot shape and dimensions.

The collimator may comprise a voice-coil arrangement for adjusting spot shape and dimensions

BRIEF DESCRIPTION OF THE DRAWINGS

Preferred embodiments of the present invention will be explained in further detail below by way of examples and with reference to the accompanying drawings, in which.

DETAILED DESCRIPTION OF THE PREFERRED EMBODIMENTS

An embodiment of an optical sensing apparatus 100 of the present invention as depicted in FIGS. 1 to 5 comprises an optical source 120 and optical detector 140. The optical source 120 is arranged for projecting an optical beam towards a destination, and the optical detector is arranged and disposed for detecting optical signals returned from an object placed at the destination. By processing the optical signal detected at the optical detector due to reflection by an object at the destination, spatial characteristics, such as, for example, location, movement, proximity etc., could be evaluated with reference to the characteristics of the reflected optical signals.

Figure 3:
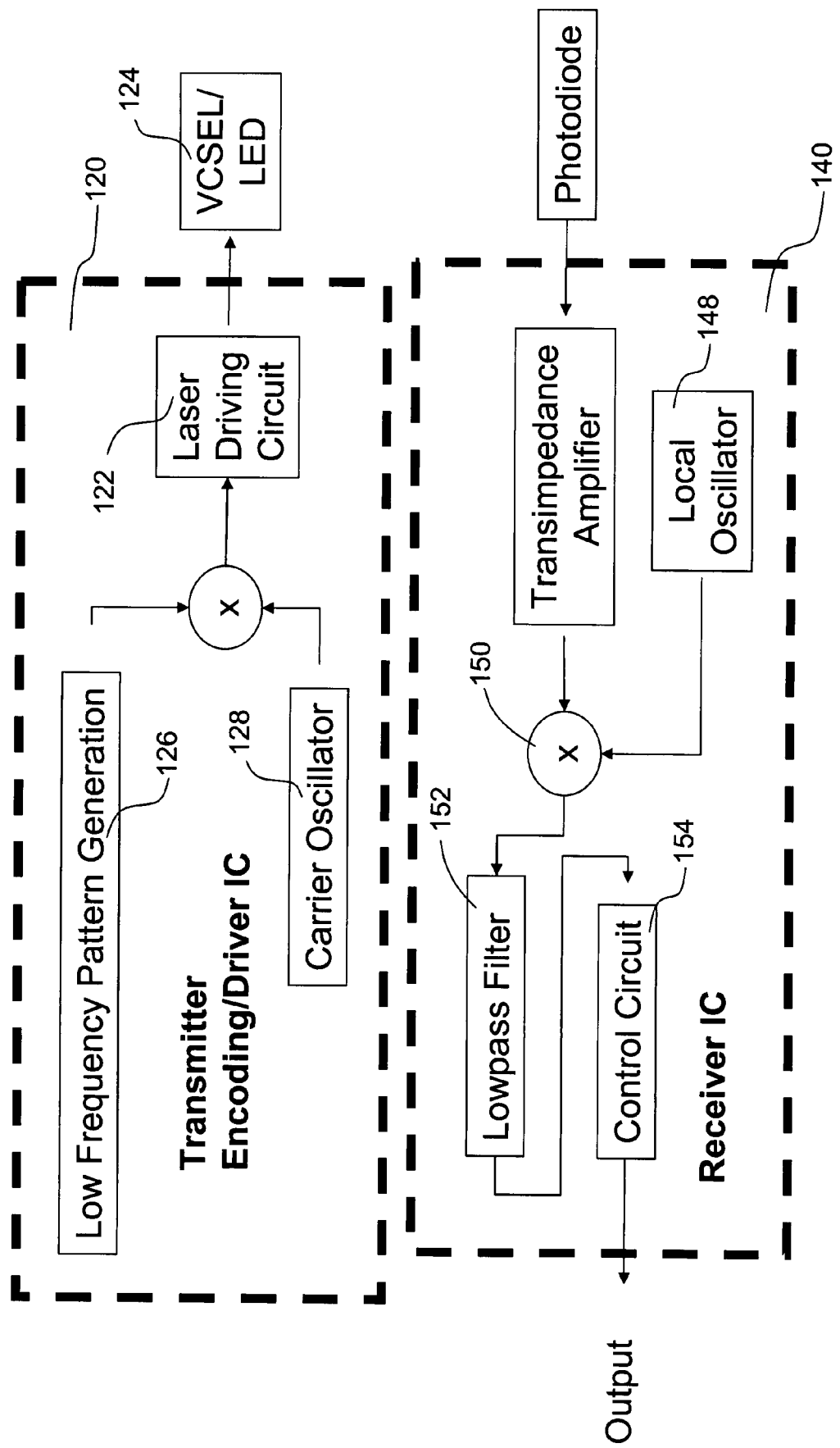
FIG. 3 is a block diagram showing the components of the optical apparatus of this invention in block diagrams.
Figure 4:
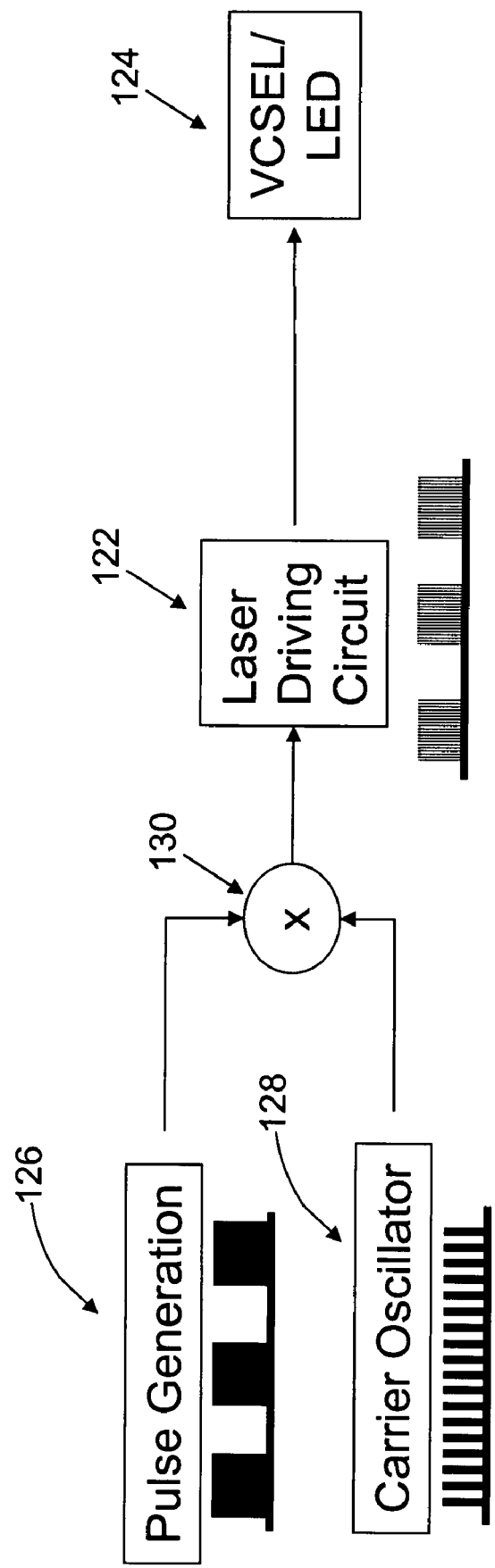
FIG. 4 is a schematic diagram showing an exemplary configuration of an optical source of this invention.
Figure 5:
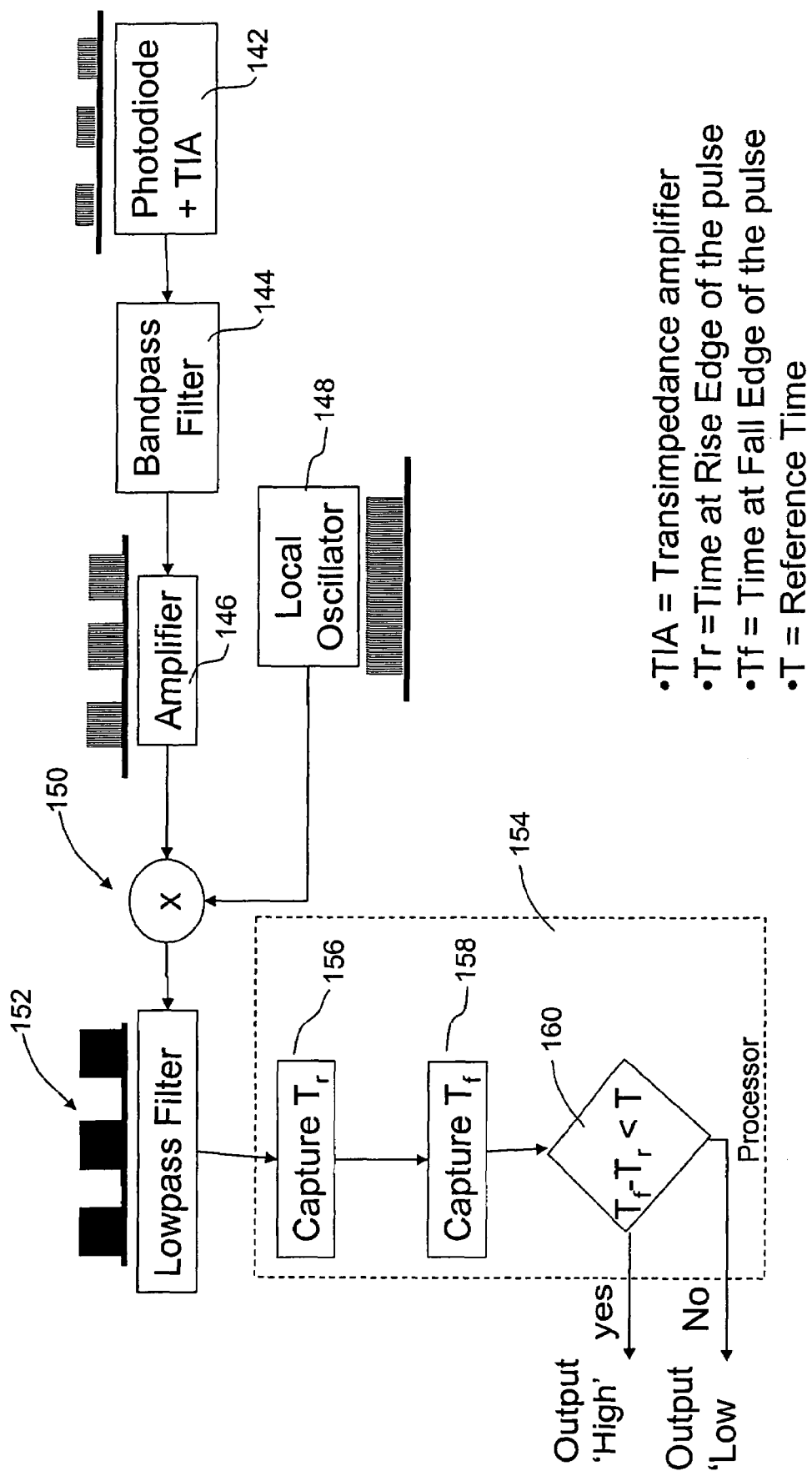
FIG. 5 is a block diagram showing an exemplary configuration of an exemplary configuration of an optical detector of the present invention with a signal processor.

The optical source 120 comprises a light emitting source 124, such as an LED or a laser source, for example, a VCSEL laser source. The light source is driven by a driving circuit 122, such as a laser driving circuit which establishes the operation conditions of the light emitting source. In addition, a signal source is provided to modulate the laser driving circuit. The signal source is arranged to deliver a train of pulses to the laser driving circuit so that the optical output from the light emitting source consists of a train of optical pulses. To alleviate adverse influence due to interference by ambient or background optical signals, such as background lighting by fluorescent lamps, the pulse train comprises modulated pulses, as shown in more detail in FIG. 6. To facilitate the provision of a signal train comprising a pulse train of modulated pulses, the signal source for driving the laser driving circuit comprises a pulse generator 126 in combination with a carrier frequency oscillator 128, and the signals are combined at a signal mixer 130 at the front end of the laser driver circuit, as shown in FIGS. 3 and 4.

The optical detector 140 is configured for detecting optical signals originated from the optical source and comprises an optical front-end 142 having a photo-diode and a transimpedance amplifier. Output of the optical front-end is processed by a band-pass filter 144 before the signal is further amplified by an amplifier 146 downstream of the detector front-end. The band-pass filter 144 is configured so that only a radio frequency spectrum corresponding to the modulated carrier frequency at the optical source will be permitted to pass. The amplified signals are then subject to demodulation by operation with a local oscillator 148 which is tuned to the carrier frequency at a demodulator 150. The demodulated output is then subjected to a low-pass filter 152 to recover the base band signals which carry the relevant spatial characteristics. The base-band signals are then processed at a processor 154 which comprises a first edge tracking means 156 for tracking and capturing the rising edge timing of a pulse, a second edge tracking means 158 for tracking and capturing the falling edge of a pulse, and a comparator 160 for comparing the pulse width of a pulse with respect to a reference pulse width. By processing the recovered base band signals, the pulse width of a base band pulse corresponding to an optical pulse detected at the detector could be determined. For example, the reflected signal pulse width could be evaluated by reference to the time of the rising edge of a pulse ($T_r$) and the time of the falling edge of a pulse ($T_f$), and equals $T_f$-$T_r$. By comparing the pulse width with a reference pulse width time (T), the difference of pulse width between a reflected pulse and a transmitted pulse could be evaluated. If the pulse width of a reflected pulse is smaller than the reference pulse width by a pre-determined threshold, a "high" output indicating detection on object movement will be given. Alternatively, if the difference in pulse widths between the reflected pulse width and the reference pulse width is below the threshold, a "low" output, indicating full reflection or non-detection of object movement of an optical pulse, will be output.

Figure 6:
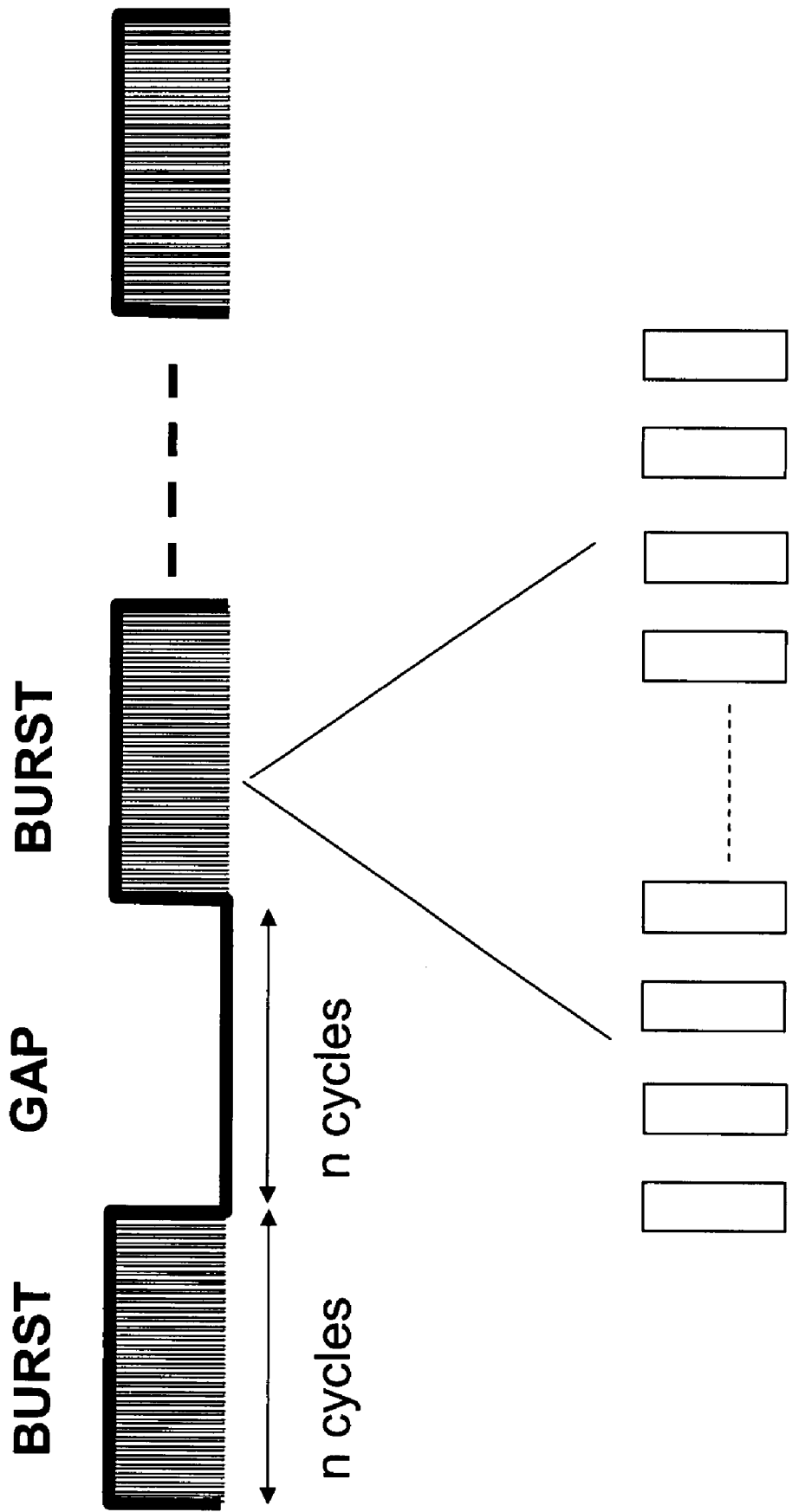
FIG. 6 illustrates an exemplary optical pulse train emitted by the optical source of FIG. 1, FIGS. 7A-7D show the relationship between the transmitted and returned optical pulses for the following scenarios: A), no reflection, B) from a stationary object, C) from a moving object, and D) from a moving object with a stationary object in the background.

An exemplary pulse train modulated by a carrier frequency suitable for this application is shown in more detail in FIG. 6.

Figure 1:
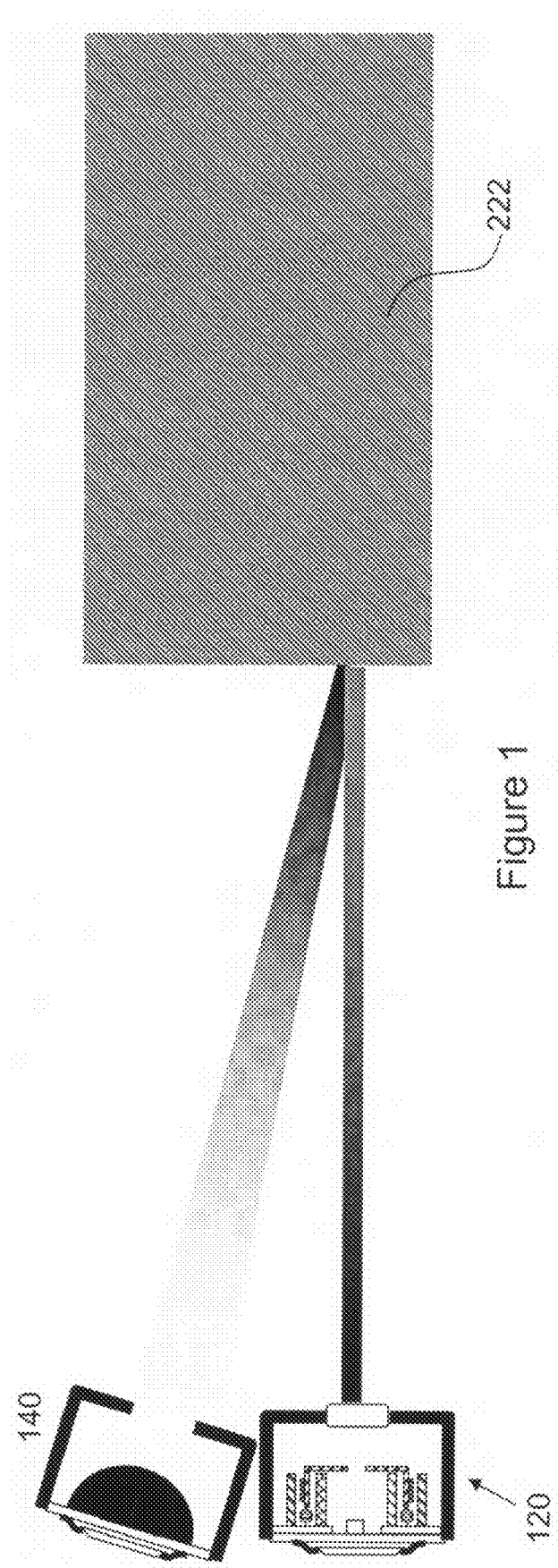
FIG. 1 shows an exemplary optical sensing arrangement comprising an optical sensing apparatus of this invention and an exemplary object being monitored.
Figure 2:
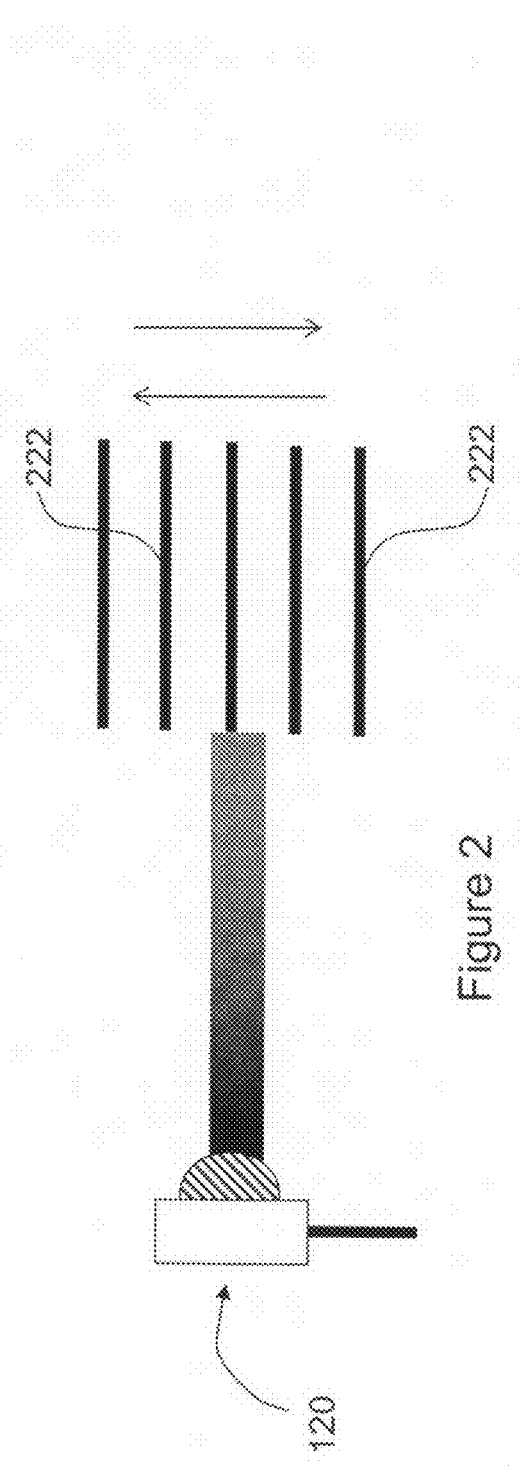
FIG. 2 is a schematic diagram illustrating the exemplary relationship between an optical source of the arrangement of FIG. 1 and a plurality of objects to be monitored.

In this embodiment, the optical sensing apparatus is configured as an apparatus for detecting or sensing movement of objects as shown more particularly in FIG. 2. In this arrangement, the optical pulse beam is transmitted towards a destination at which the object 222 to be monitored is located. The direction of the optical beam is transmitted at an angle to the direction of movement of the objects. In this particular example, the optical beam is at a right angle to the direction of movement.

Four exemplary scenarios are described in FIGS. 7A to 7D below to illustrate general principles of operation of this embodiment. In the scenario of FIG. 7A, no object is located at the destination and there will be no reflected optical pulse from the destination in response to the optical pulse transmission of the optical source. More particularly, when an optical pulse train is transmitted towards the destination, no optical detection will occur at the optical detector since no optical pulses are reflected from the destination. As a result, no rising edge nor falling edge could be detected and the receiver output will be assigned to "low", indicating no detected movement of a target object at the destination.

In FIG. 7B, a stationary object is placed at the destination. In such a scenario, the pulse width of the reflected optical pulse will be identical to that of the originating pulse train. As there is no variation in effective pulse widths between the transmitted and reflected optical train, the pulse reflection is complete and a "low" output will present.

In FIG. 7C, the optical beam is delivered towards a destination along an axial direction and encounters an object 222 which is moving along a direction orthogonal to the axial direction. The transit time of the object, which is defined for the present purpose as the time which the object requires to travel through the optical detection range or reflection range of the optical beam, is less than the pulse duration or the pulse width of the optical pulses of the optical beam. As the object transit time is less than the pulse width, only part of an optical pulse will be reflected when the object 222 transmits through the detection range. The excess portion of the pulse width which has missed the object will then pass through unreflected and then undetected by the optical detector. Under such a condition, only a portion of the optical pulse will be reflected and the pulse width of the reflected pulse will be shorter than the originally transmitted pulse. By capturing the rise time and fall time of a reflected pulse, the pulse width or pulse duration of a reflected pulse can be evaluated. By comparing the pulse width of the reflected pulse with respect to a reference duration, which is the pulse width of the transmitted optical pulse, the presence or absence of a moving object can be sensed. Upon detection of a shorter reflected pulse, the processor will output a "high" signal, indicating a moving object.

The situation of FIG. 7D is substantially identical to that of FIG. 7C except that a stationary object is in the background with a moving object 222 intermediate the optical source and the stationary background. The pulse width of a reflected pulse will be shortened on encountering a moving object similar to that of FIG. 7C and a similar "high" output will be given by the processor to indicate the sensing of a moving object.

In addition to the sensing or object movement, this arrangement can be used to detect and evaluate proximity between moving objects. For example, by identifying adjacent reflected pulses which are shortened with respect to the originally transmitted train of process, the separation of adjacent moving objects can be evaluated with reference to the duration between adjacent shortened pulses as shown in FIGS. 7C and 7D.

Figure 8B:
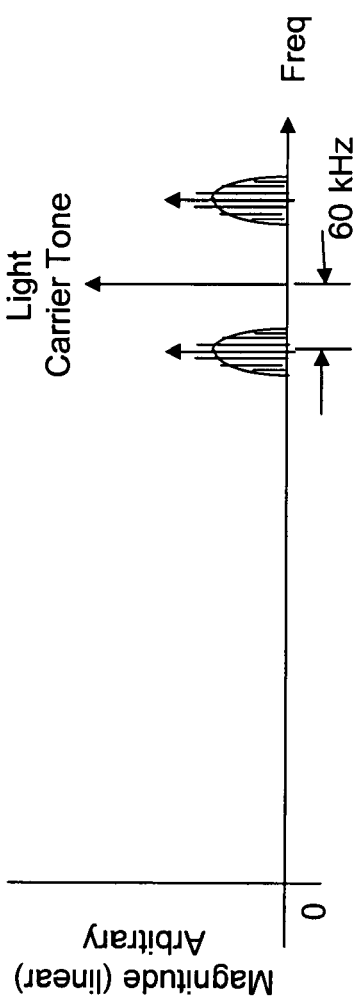
FIGS. 8A-8D illustrate the modulated optical signals at various nodes of the optical apparatus, namely, A) at the laser driver output, B) after modulation, C) at the photo-diode detection, and D) after demodulation.
Figure 8D:
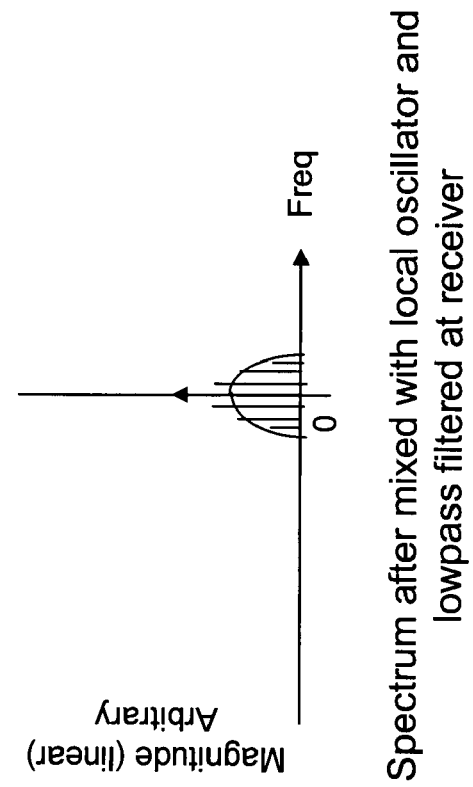
Figure 8A:
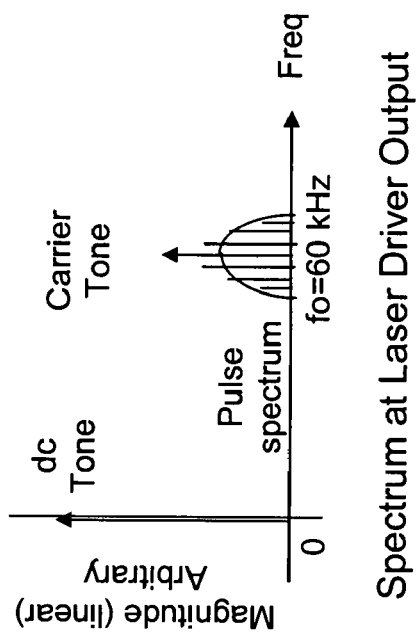
Figure 8C:
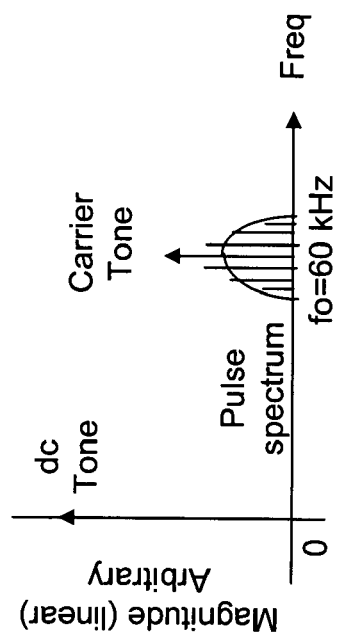

The modulation characteristics of the pulses will be described with reference to FIGS. 8A to 8D. With the following exemplary system parameters, Wavelength of infrared light=850 nm (VSCEL)
Carrier Frequency=50 kHz
Pulse Rate=2 kHz
Corresponding Pulse width and pulse interval=0.5 milliseconds
Reference Time, T=0.5 milliseconds
Receiver Output condition: signal "high" when received pulse width<T Initially, a train of pulses is modulated by the 50 kHz carrier frequency, as shown in FIG. 8A. The modulated signal is then up-converted by an optical carrier into an optical pulse train, as shown in FIG. 8B. At the detector front-end, the RF modulated signals are recovered after the optical components have been removed, as shown in FIG. 8C. Next, the modulated signals are then subjected to the demodulation so that the base-band signals are recovered, as depicted in FIG. 8D.

Figure 9A:
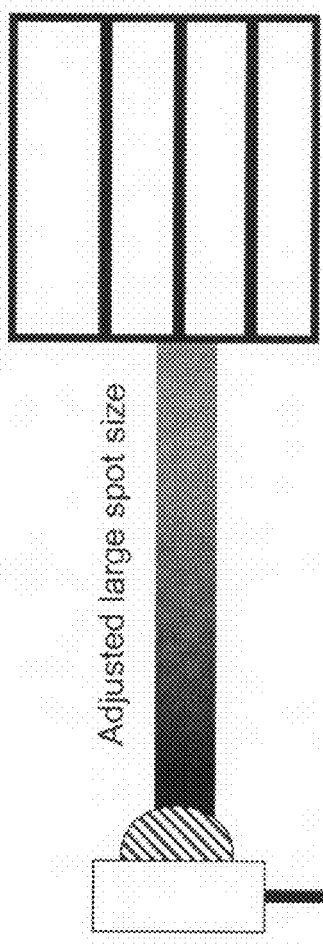
FIGS. 9A and 9B illustrate a collimator of this invention with variable light spot size with respect to objects of different thickness and separation.
Figure 9B:
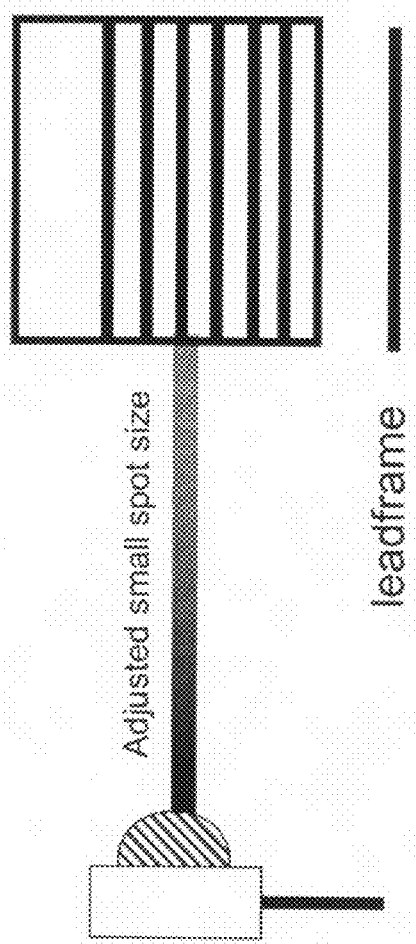
Figure 10B:
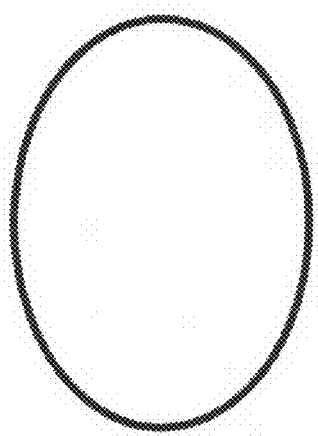
FIGS. 10A and 10B illustrate the side and front views of a beam collimator suitable for use with an optical source of this invention.
Figure 10A:
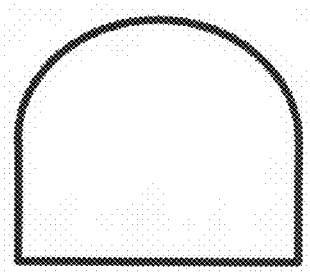
Figure 10C:
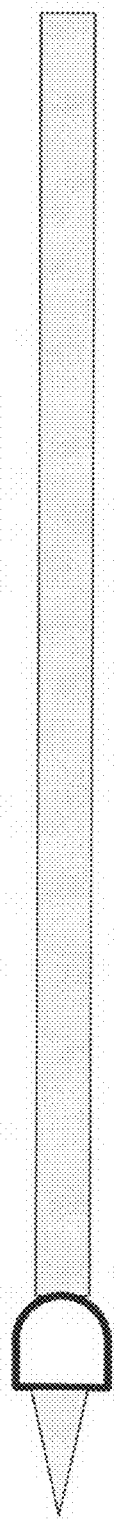
FIGS. 10C and 10D illustrate variation in beam divergency of this invention.
Figure 10D:
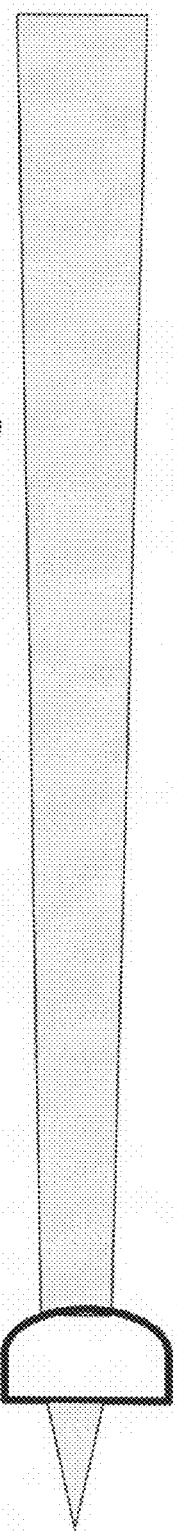

In order to cater for objects characterized by different transit times, or objects of different width or separation, it will be beneficial if the spot size of an optical beam can be adjusted. For example, as shown in FIGS. 9A and 9B, when the objects being sensed are relatively thick and/or with a large inter-object separation, an optical beam with a larger spot size could be used. On the other hand, when an object having a relatively small thickness or a small inter-object transition time, it will be beneficial to have an optical beam having a smaller spot size so that movement or proximity between objects could be more accurately monitored. Furthermore, since an application of this sensing apparatus is to monitor movement of objects along a specific motion direction, it will be beneficial if the spot size is non-circular so that the lateral extent of a beam is larger than the dimension of the beam spot along the motion direction so that a large lateral span could be covered for a higher sensitivity while maintaining a higher resolution, so that the movement of objects with closer proximity or separation could be detected. For example, a collimated beam as shown in FIG. 10C or a slightly divergent beam of FIG. 10D could be used by using an appropriate collimating lens design.

Figure 11:
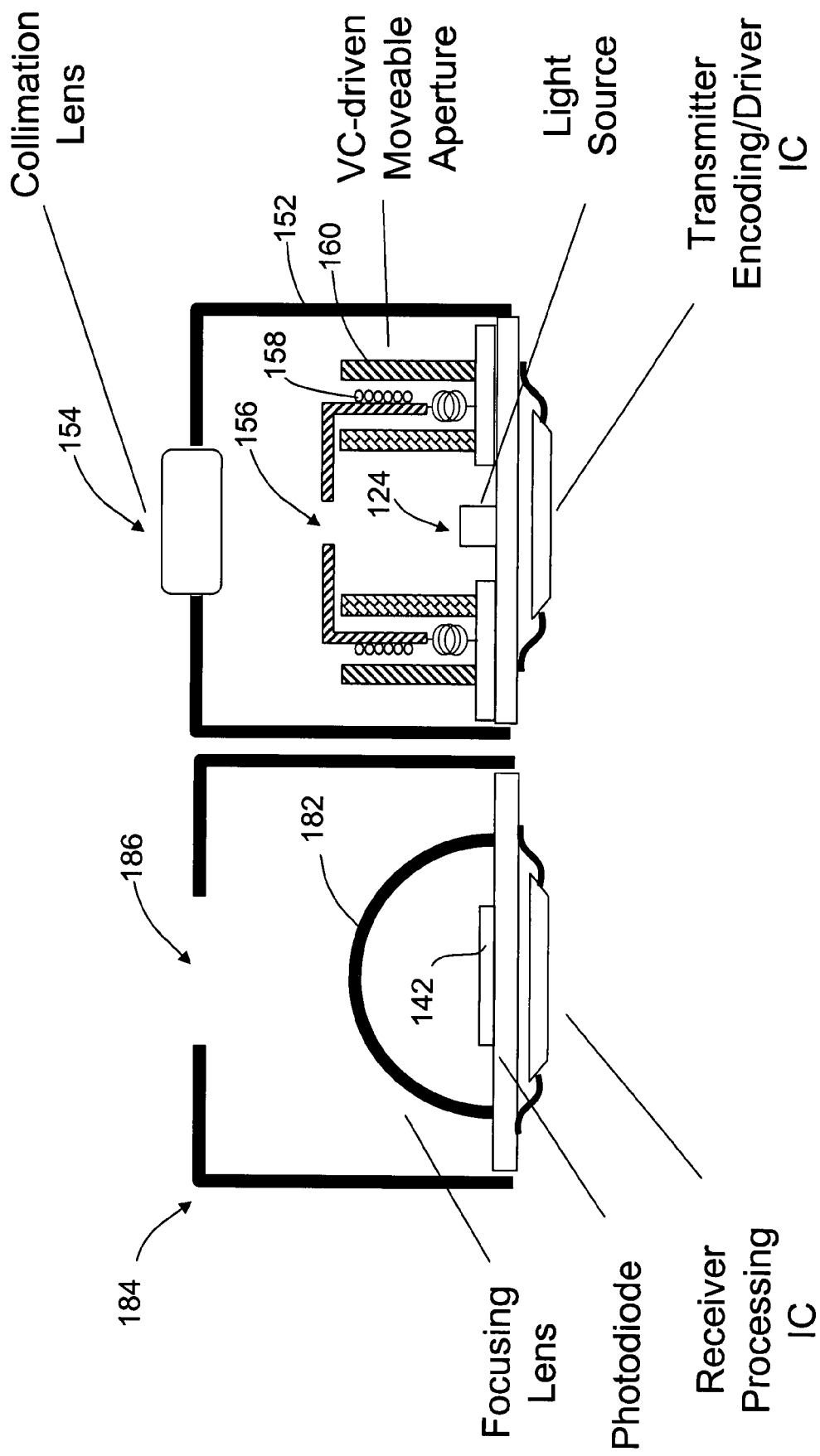
FIG. 11 illustrates a schematic diagram of a voice coil suitable for varying the beam spot size of an output beam for this application.
Figure 12:
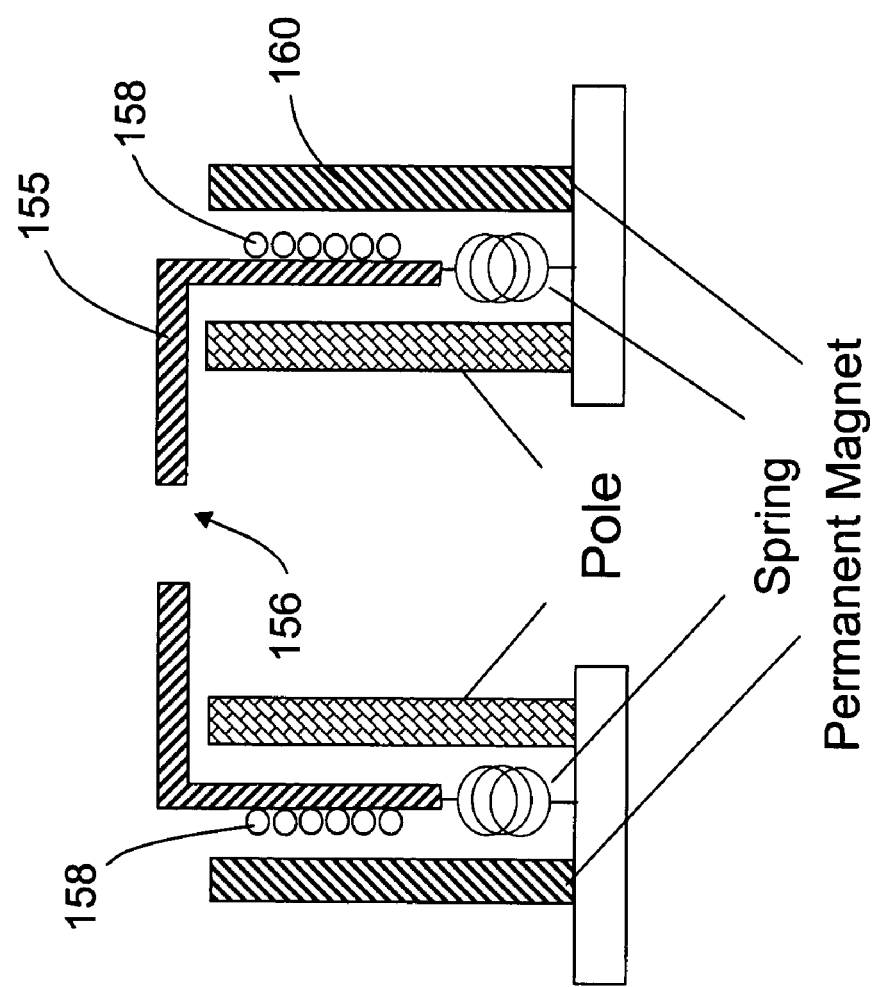
FIG. 12 illustrates a cross-section of a voice coil structure suitable in this application.

In order to adjust the spot size of an optical beam, an arrangement as shown in FIGS. 11 and 12 could be used. In FIG. 11, the light source 124 is enclosed within a housing 152 defining an aperture through which an optical beam generated by the light source 124 could be emitted towards a destination through a collimation lens 154 of an appropriate type or the type described with reference to FIGS. 10A and 10B. The spot size adjustment arrangement comprises a movable aperture arrangement comprising a pin-hole carrier 155 which defines an aperture 156. The pin-hole carrier 155 is movable along an axial direction towards and away from the light source so that, by moving the pin-hole carrier along the axial direction, the spot size of the optical beam could be adjusted. This pin-hole carrier is movable by an arrangement more commonly known as a "voice-coil" arrangement in which a coil 158 is wound about the pin-hole carrier 155 about an axial which is coincident with the optical axis. The voice-coil is placed proximal to a magnet 160 so that by passing a current of an appropriate plurality through the voice-coil 158, the axial separation between the aperture 156 and the light source 124 could be adjusted to produce a beam spot of an appropriate size. At the detector end, a focusing lens 182 is placed upstream of the photo-diode 142 with sub-assembly of the focusing lens 182 and the photo-diodes 142 placed within a detector housing 184 defining an optical aperture 186 for detection of a beam from the destination.

While the present invention has been explained by reference to the examples or preferred embodiments described above, it will be appreciated that those are examples to assist understanding of the present invention and are not meant to be restrictive. Variations or modifications which are obvious or trivial to persons skilled in the art, as well as improvements made thereon, should be considered as equivalents of this invention.

Furthermore, while the present invention has been explained by reference to and arrange for movement sensing, it should be appreciated that the invention can apply, whether with or without modification, to other optical sensing applications without loss of generality.

The invention claimed is:

1. A method of sensing movement or proximity of an object at a destination by optical reflection, the method comprising the steps of:
    transmitting a train of coded optical pulses towards the object at the destination from a light source, wherein a direction of transmission of the train of coded optical pulses is substantially orthogonal relative to a direction of movement of the object at the destination;
    sensing coded optical pulses reflected from said destination; and
    sensing and evaluating at least one of:
        (i) movement of the object at said destination, said movement being in a direction orthogonal relative to the direction of the transmitted train of optical pulses by evaluating a variation in pulse width between transmitted and reflected coded optical pulses; and
        (ii) proximity characteristics of the object at the destination, by reference to variation in pulse width between transmitted and reflected coded optical pulses.

2. A method according to claim 1, further comprising the step of outputting a positive orthogonal object movement signal when the variation in pulse width between said transmitted and said reflected coded optical pulses exceeds a pre-determined threshold.

3. A method according to claim 1, wherein said train of coded optical pulses comprises coded optical pulses of a pre-determined pulse width transmitted at pre-determined intervals.

4. A method according to claim 3, wherein the pulse width or pulse duration of said coded optical pulses are larger than the transit time of said objects with respect to said optical train.

5. A method according to claim 1, wherein said train of optical pulses comprises a series of alternate modulated bursts and zeroes.

6. A method according to claim 1, wherein said optical pulses are transmitted by way of an optical beam of a pre-determined spot size, and the beam spot size is adjustable.

7. An apparatus comprising an optical source, an optical detector and a signal processor, wherein said optical source is arranged for emitting a train of coded optical pulses towards a destination, and said optical detector is arranged for sensing pulses reflected from said destination; and wherein said signal processor is arranged for processing pulses detected by said optical detector such that orthogonal movement or proximity information of an object or objects at said destination is produced by evaluating variation in optical pulse width between a transmitted pulse and a detected pulse.

8. An apparatus according to claim 7, wherein the optical source is arranged so that the direction of transmission of optical pulses is orthogonal to the direction of movement of objects to be detected.

9. An apparatus according to claim 7, wherein said optical source comprises a collimator which is arranged to transmit an optical beam with an adjustable spot shape and dimensions.

10. An apparatus according to claim 9, wherein said collimator comprises a voice-coil arrangement for adjusting spot shape and dimensions.

11. A method of sensing movement or proximity of an object at a destination by optical reflection, the method comprising the steps of:
    transmitting a train of coded optical pulses towards the object at the destination from a light source, wherein a direction of transmission of the train of coded optical pulses is substantially orthogonal relative to a direction of movement of the object at the destination, wherein said optical pulses are transmitted by way of an optical beam of a pre-determined spot size, and the beam spot size is adjustable such that when the object being sensed is thick, a larger spot size is used and when the object being sensed is of small thickness, a small spot size is used, and wherein the spot size is non-circular, sensing coded optical pulses reflected from said destination; and
    sensing and evaluating at least one of:
        (i) movement of the object at said destination, said movement being in a direction orthogonal relative to the direction of the transmitted train of optical pulses by evaluating a variation in pulse width between transmitted and reflected coded optical pulses; and
        (ii) proximity characteristics of the object at the destination, by reference to variation in pulse width between transmitted and reflected coded optical pulses.

* * * * *